No. 774,192. PATENTED NOV. 8, 1904.
G. A. MANWARING.
METHOD OF DUPLICATING SOUND RECORDS.
APPLICATION FILED MAR. 30, 1904.
NO MODEL. 2 SHEETS—SHEET 1.
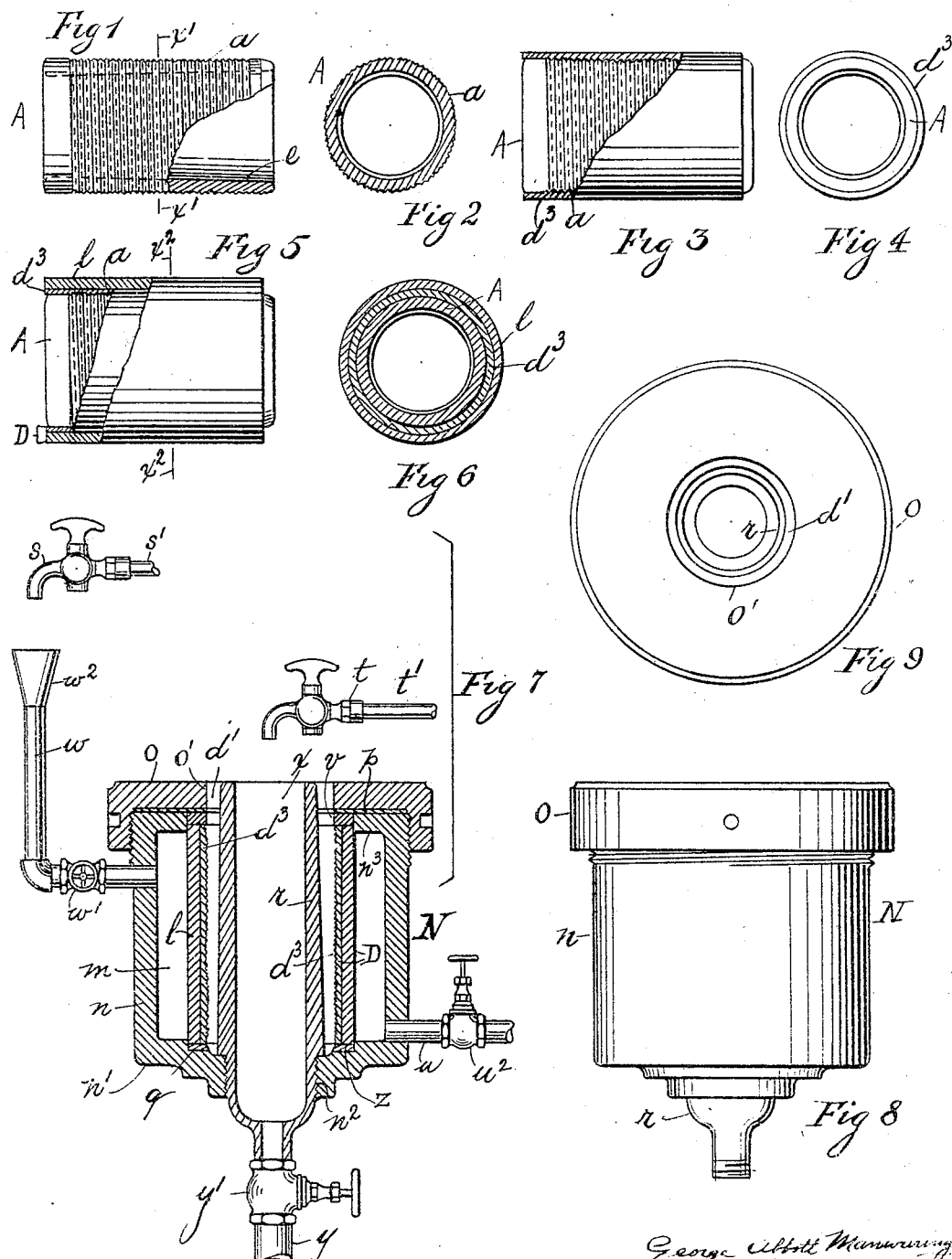

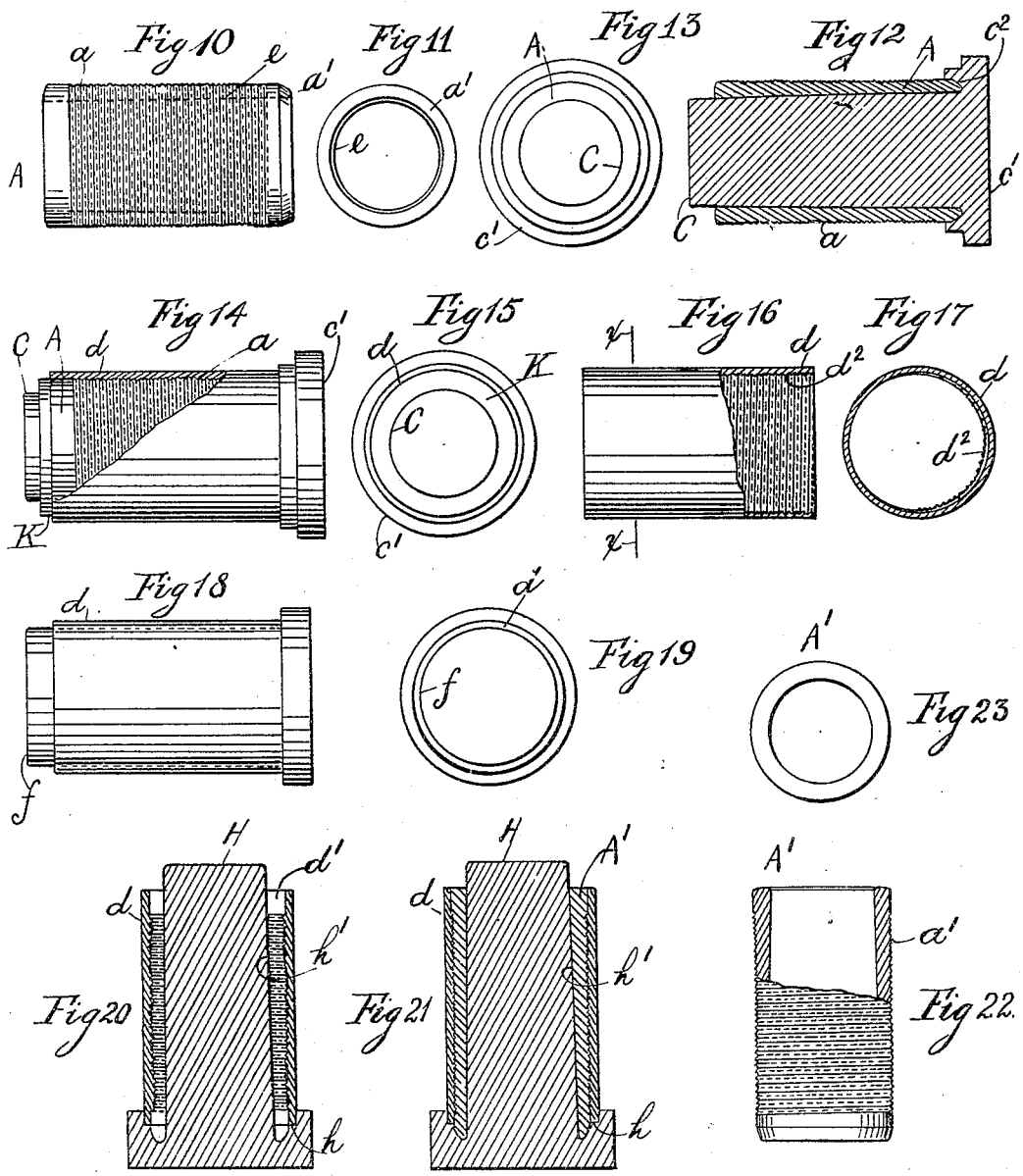

No. 774,192.

Patented November 8, 1904.

UNITED STATES PATENT OFFICE.

GEORGE ABBOTT MANWARING, OF BAYONNE, NEW JERSEY, ASSIGNOR TO AMERICAN GRAPHOPHONE COMPANY, OF BRIDGEPORT, CONNECTICUT, A CORPORATION OF WEST VIRGINIA.

METHOD OF DUPLICATING SOUND-RECORDS.

SPECIFICATION forming part of Letters Patent No. 774,192, dated November 8, 1904.

Application filed March 30, 1904. Serial No. 200,771. (No model.)

*To all whom it may concern:*

Be it known that I, GEORGE ABBOTT MANWARING, a citizen of the United States, residing at Bayonne, county of Hudson, and State of New Jersey, have invented a new and useful Improvement in Methods of Duplicating Sound-Records, of which the following is a specification.

My invention relates to a process or method of making records for talking-machines; and its object comprises the steps necessary to produce such records when employing the expansion of molds or matrices in which such records are formed.

Records for talking-machines are generally made by electroplating the original or master record, backing the thin plated shell thereby obtained with lead or the like for strength, and then removing the original or master record, leaving the hollow reverse copy or matrix for the insertion of material to form a copy or reproduction of the original record. Heretofore in the reproduction of such records it has been necessary to use material that would shrink away from the matrix or mold when cooling to allow its removal from the said matrix or hollow reverse copy of the master-record. This renders available a much wider range of material for making the duplicates.

My invention comprises the expansion of a matrix to enable the employment of material for the reproduction which does not require shrinking to be removed from the said matrix, allowing the employment of paper with a surface coating or other material that will not permit being contracted to take the impressions from the matrix.

My invention broadly consists in the method of separating the reproduction of the record from its surrounding matrix by means of the expansion of the said matrix instead of by the contraction of the reproduction. To carry out my invention, I can expand the said matrix either by chemicals or solutions thereof or by other means, as by the application of heat to the matrix while the reproduction is kept relatively cool. I attain these ends by the means illustrated in the accompanying drawings, in which—

Figure 1 represents a partial front view and longitudinal section of a master-record. Fig. 2 is a section of Fig. 1 on the line $x' x'$. Fig. 3 represents a partial outside front view and axial section of a coating on a master-record. Fig. 4 is an end view of Fig. 3. Fig. 5 represents the elements shown in Fig. 3 with a backing on the coating, shown partly in section. Fig. 6 is a section of Fig. 5 on the line $x^2 x^2$. Fig. 7 represents an axial section of an apparatus with the matrix or reverse copy therein for forming the reproduction, some of the said apparatus being shown in full. Fig. 8 is a partial side view of Fig. 7. Fig. 9 represents a top view of Fig. 8. Fig. 10 represents an outside view of an original or master record. Fig. 11 shows an end view of Fig. 10. Fig. 12 is an axial section of the master-record mounted on a mandrel. Fig. 13 shows an end view of Fig. 12. Fig. 14 represents the same elements as shown in Fig. 12 with a matrix on the master-record, partly in section. Fig. 15 is an end view of Fig. 14. Fig. 16 represents an outside front view and partial axial section of the matrix or reverse copy of the master. Fig. 17 is a section on the line $x x$ of Fig. 16. Fig. 18 represents an outside view of the matrix or reverse copy on a holder or shaper. Fig. 19 shows an end view of Fig. 18. Fig. 20 represents an axial section of the matrix on a holder somewhat smaller in diameter than said matrix. Fig. 21 represents the elements shown in Fig. 20 with the material in place to form the reproduction of the master-record. Fig. 22 shows an outside view and axial section of the completed reproduction of the master-record. Fig. 23 is a top view of Fig. 22.

The appurtenances and steps of my invention comprise a master-record A, of the usual cylindrical shape, with a tapering internal surface and indentations or impressions on its outer surface in helical paths around the same.

My preferred way of carrying out the invention consists in covering the master-record A with a suitable coating $d^3$, Fig. 3, of copper or the like, by electroplating or the like, and then reinforcing the said coating $d^3$ by a suitable material $l$ to strengthen the thin metallic coating, the combination forming a matrix, (designated by the letter D.) If desirable, the coating $d^3$ can be made sufficiently thick for strength to avoid applying the extra reinforcing material $l$. The master-record is now removed from the said matrix D by shrinking it therefrom or detaching it by any other means, after which the said matrix is placed into a receptacle N. The said receptacle consists of the walls $n$, extending from a bottom $n'$, that has formed therein a shoulder $q$, which latter is threaded through its central portion $n^2$. A packing-ring $z$ is placed on the shoulder $q$ and supports the matrix D, which latter carries a ring $v$, that fits in the annular projection $n^3$, extending horizontally from the walls $n$. A packing-ring $p$ covers both the ring $v$ and projection $n^3$. A hollow core $r$ is screwed into the threaded portion $n^2$ of the receptacle and has its outside surface tapered to correspond to the internal surface of a master-record. Inlet-piping $w$, with a valve $w'$ and funnel $w^2$, is attached to the upper portion of the wall $n$, while outlet-piping $u$, with the valve $u^2$, is connected to the lower portion thereof, and the outlet-piping $y$, with the valve $y'$, extends from the hollow core $r$. A faucet $s$, with piping $s'$, is arranged over the funnel $w^2$, and a faucet $t$, with the piping $t'$, is located over the hollow core $r$. A cover O, with a central piping $o'$, is screwed on the top of the receptacle. After the matrix D has been placed into the receptacle N and made to bear upon the packing-ring $z$ the ring $v$ is put in place with the packing $p$ and cover $o$, which latter is screwed down to securely hold the said matrix, while at the same time fluid-tight joints are made with the ring $z$ and packing $p$. Next the material to form the reproduction is introduced into the space $d'$ by being poured or forced therein or in any suitable manner. The said material will conform to the tapered core $r$, forming the inner surface of the reproduction, and also to the form of the matrix D to form the outside cylindrical surface of the reproduction with its indentations or impressions. A liquid is circulated through the hollow core $r$ in the direction of its longitudinal axis by means of the piping $t$ and $y$ to maintain the reproduction at a comparatively low temperature, and a warmer liquid is circulated in the space $m$ by means of the piping $w$ and $u$, to expand the matrix D away from the said reproduction, after which the latter can be removed from the receptacle N by taking off the cover $o$, packing $p$, and ring $v$, obtaining a copy of the master-record, which is then properly trimmed on its edges.

A modification of my method is to place the record A on a holder C, having a base $c'$ with a circular groove $c^2$ corresponding to the edge $a'$ of the master-record. Then a coating of gelatin or the like is formed on the master-record by either dipping the same in a solution thereof, brushing it on, or allowing the solution to flow over the record. The coating is allowed to dry or harden in place, forming the matrix $d$, which is securely held on the mandrel C by the ring K, the latter being tightly secured on said mandrel. The matrix $d$ is next expanded, generally by moistening the same, until it becomes sufficiently enlarged to slip off the master-record and mandrel without injury to its indentations or impressions and which latter to prevent confusion are designated by the letter $d^2$. The next step is to place the matrix $d$ on a holder $f$ to allow it to dry, harden, and shrink to the size and shape required to produce the reproduction of the same diameter and shape as the master-record. The matrix $d$ is now placed on a shoulder $h$ of a holder H, the sides $h'$ I of said holder being of a diameter and inclination equivalent to the internal surface of a master-record. Next the material A' for forming the reproduction is poured or placed by any suitable means into the annular space $d'$ between the holder H and the matrix $d$ and allowed to cool, after which the matrix $d$ is expanded by moistening the same and separated from the reproduction A'. The matrix $d$ is then again placed on the holder $f$ to repeat the steps from that point on, the completed reproduction A' being shown with its indentations or impressions $a^2$.

Having described my invention, I claim—

1. The process of obtaining duplicate sound-records, which consists of forming within a matrix a duplicate record of suitable material, and then expanding said matrix to disengage it from said duplicate.

2. The method of producing talking-machine records, consisting in making a hollow matrix with impressions therein, inserting a material in the matrix, forming a reversed copy on the said material of the said impressions, and expanding the matrix from the said material.

3. The method of producing talking-machine records, consisting in making a hollow matrix with impressions therein, inserting a material in the matrix, forming a reversed copy on the said material of the impressions on the matrix, and then heating the matrix to expand it from the said material.

4. The method of producing talking-machine records, consisting in covering a master-record with a coating to form a matrix, removing the master-record from the matrix, placing a material in the matrix to form the record, maintaining the means to hold the said material in the matrix at a lower temperature than the said matrix, expanding the matrix, and removing the record.

5. The method of producing the talking-machine records, consisting in covering a master-record with a coating to form a matrix having impressions on its internal surface reversed from the master-record, circulating a fluid, through the longitudinal axis of the record, circulating a fluid on the outside of the matrix, of a higher temperature than the fluid circulating through the axis of the record, to expand the matrix from the record, and removing the matrix from the record.

6. The method of making reproductions of talking-machine records, consisting in electroplating a metallic coating on a record to form a matrix having impressions on its internal surface, reversed from the impressions of the said record, strengthening the coating with a backing, placing the record material within the matrix, circulating a fluid through the longitudinal axis of the record to maintain the reproduction at a lower temperature than the matrix, circulating a warmer fluid on the outside of the matrix to expand the latter, and removing the reproduction from the matrix.

In testimony whereof I have signed my name to this specification, in the presence of two subscribing witnesses, this 25th day of March, 1904.

GEORGE ABBOTT MANWARING.

Witnesses:
C. A. L. MASSIE,
R. L. SCOTT.